United States Patent
Adams et al.

(10) Patent No.: US 8,791,852 B2
(45) Date of Patent: Jul. 29, 2014

(54) STANDOFF RANGE SENSE THROUGH OBSTRUCTION RADAR SYSTEM

(71) Applicant: VAWD Applied Science and Technology Corporation, Tucson, AZ (US)

(72) Inventors: Vinh H. Adams, Tucson, AZ (US); Robert Adams, Tucson, AZ (US); Wesley H. Dwelly, Sahuarita, AZ (US)

(73) Assignee: VAWD Applied Science and Technology Corporation, Tucson, AZ (US)

( * ) Notice: Subject to any disclaimer, the term of this patent is extended or adjusted under 35 U.S.C. 154(b) by 0 days.

(21) Appl. No.: 14/039,243

(22) Filed: Sep. 27, 2013

(65) Prior Publication Data

US 2014/0022118 A1 Jan. 23, 2014

Related U.S. Application Data

(62) Division of application No. 12/916,008, filed on Oct. 29, 2010.

(60) Provisional application No. 61/257,469, filed on Nov. 3, 2009.

(51) Int. Cl.
*G01S 13/00* (2006.01)
*H01Q 19/13* (2006.01)
*G01S 13/86* (2006.01)
*G01S 13/88* (2006.01)
*H01Q 1/12* (2006.01)
*G01S 7/04* (2006.01)
*G01S 13/522* (2006.01)
*G01S 13/58* (2006.01)

(52) U.S. Cl.
CPC ............... *G01S 7/04* (2013.01); *H01Q 19/132* (2013.01); *G01S 13/522* (2013.01); *G01S 13/867* (2013.01); *G01S 13/582* (2013.01); *G01S 13/888* (2013.01); *G01S 13/865* (2013.01); *H01Q 1/125* (2013.01)
USPC ............... 342/22; 342/95; 342/176; 342/179; 342/181; 342/182

(58) Field of Classification Search
CPC ..... G01S 13/0209; G01S 13/66; G01S 13/88; G01S 13/885; G01S 13/887; G01S 13/888; G01S 13/89; G01S 7/04; G01S 7/06; G01S 7/066; G01S 7/22
USPC ............... 342/22, 94–97, 176, 179, 181, 182, 342/183; 715/700–866
See application file for complete search history.

(56) References Cited

U.S. PATENT DOCUMENTS

| | | | |
|---|---|---|---|
| 3,010,102 A | 11/1961 | Ketchledge et al | |
| 3,108,270 A | 10/1963 | Fairbanks | |
| 3,592,122 A | 7/1971 | Hughes | |
| 3,644,043 A | 2/1972 | Jones et al. | |
| 3,755,812 A * | 8/1973 | Bechtel et al. | 342/161 |
| 3,787,857 A | 1/1974 | Lazarchik et al. | |
| 3,949,404 A | 4/1976 | Fletcher et al. | |
| 3,981,010 A | 9/1976 | Michelsen | |
| 4,050,068 A | 9/1977 | Berg et al. | |
| 4,062,018 A | 12/1977 | Yokoi et al. | |
| 4,160,251 A | 7/1979 | Lazarchik et al. | |
| 4,312,002 A | 1/1982 | Stewart | |
| 4,642,641 A * | 2/1987 | Campbell | 342/88 |
| 4,652,885 A | 3/1987 | Saffold et al. | |
| 4,780,719 A | 10/1988 | Frei et al. | |
| 5,081,456 A * | 1/1992 | Michiguchi et al. | 342/22 |
| 5,097,268 A * | 3/1992 | Bauer et al. | 342/160 |
| 5,134,409 A | 7/1992 | De Groot | |
| 5,182,564 A | 1/1993 | Burkett et al. | |
| 5,268,680 A | 12/1993 | Zantos | |
| 5,280,287 A | 1/1994 | Evans | |
| 5,300,933 A * | 4/1994 | Discenza et al. | 342/36 |
| 5,365,237 A | 11/1994 | Johnson et al. | |
| 5,446,461 A * | 8/1995 | Frazier | 342/22 |
| 5,686,690 A | 11/1997 | Lougheed et al. | |
| 5,768,131 A | 6/1998 | Lissel et al. | |
| 5,835,054 A | 11/1998 | Warhus et al. | |
| 5,920,276 A * | 7/1999 | Frederick | 342/26 B |
| 5,952,957 A | 9/1999 | Szu | |
| 6,181,271 B1 | 1/2001 | Hosaka et al. | |
| 6,249,589 B1 | 6/2001 | Hoch | |

| | | | |
|---|---|---|---|
| 6,307,521 B1 | 10/2001 | Schindler et al. | |
| 6,359,582 B1* | 3/2002 | MacAleese et al. | 342/22 |
| 6,466,155 B2* | 10/2002 | Taylor et al. | 342/22 |
| 6,587,246 B1 | 7/2003 | Anderton et al. | |
| 6,876,322 B2* | 4/2005 | Keller | 342/22 |
| 6,972,714 B1 | 12/2005 | Baharav et al. | |
| 6,985,837 B2* | 1/2006 | Moon et al. | 703/3 |
| 7,016,772 B2* | 3/2006 | Yanagi | 701/21 |
| 7,148,836 B2* | 12/2006 | Romero et al. | 342/22 |
| 7,161,525 B1* | 1/2007 | Finley et al. | 342/26 R |
| 7,180,441 B2* | 2/2007 | Rowe et al. | 342/22 |
| 7,253,766 B2* | 8/2007 | Foote et al. | 342/27 |
| 7,339,516 B2* | 3/2008 | Thompson et al. | 342/22 |
| 7,474,254 B2 | 1/2009 | White et al. | |
| 7,504,993 B2 | 3/2009 | Young et al. | |
| 7,508,342 B2 | 3/2009 | Nelson | |
| 7,889,113 B2* | 2/2011 | Cardiasmenos et al. | 342/22 |
| 8,116,520 B2* | 2/2012 | Reinpoldt, III | 382/103 |
| 8,355,538 B2* | 1/2013 | Reinpoldt, III | 382/103 |
| 2003/0112170 A1 | 6/2003 | Doerksen et al. | |
| 2004/0051659 A1 | 3/2004 | Garrison | |
| 2004/0140924 A1* | 7/2004 | Keller et al. | 342/22 |
| 2004/0222933 A1 | 11/2004 | Desargant et al. | |
| 2004/0263379 A1* | 12/2004 | Keller | 342/22 |
| 2005/0110672 A1* | 5/2005 | Cardiasmenos et al. | 342/27 |
| 2005/0230604 A1* | 10/2005 | Rowe et al. | 250/221 |
| 2005/0231416 A1* | 10/2005 | Rowe et al. | 342/22 |
| 2005/0270220 A1 | 12/2005 | Baharav et al. | |
| 2005/0270223 A1 | 12/2005 | Baharav et al. | |
| 2006/0066469 A1* | 3/2006 | Foote et al. | 342/22 |
| 2006/0164287 A1* | 7/2006 | Holt et al. | 342/22 |
| 2006/0238406 A1* | 10/2006 | Nohara et al. | 342/90 |
| 2006/0279451 A1* | 12/2006 | Rowe et al. | 342/22 |
| 2007/0001895 A1* | 1/2007 | Kolinko et al. | 342/22 |
| 2007/0030195 A1* | 2/2007 | Steinway et al. | 342/22 |
| 2007/0035436 A1* | 2/2007 | Thompson et al. | 342/22 |
| 2007/0139248 A1 | 6/2007 | Baharav et al. | |
| 2007/0146195 A1 | 6/2007 | Wallenberg et al. | |
| 2008/0266172 A1* | 10/2008 | Reinpoldt | 342/179 |
| 2009/0041293 A1* | 2/2009 | Andrew et al. | 382/100 |
| 2009/0058710 A1* | 3/2009 | Levitan et al. | 342/22 |
| 2009/0060272 A1* | 3/2009 | Reinpoldt, III | 382/103 |
| 2009/0135045 A1 | 5/2009 | Beeri | |
| 2009/0140907 A1* | 6/2009 | Keller et al. | 342/22 |
| 2009/0262006 A1* | 10/2009 | McNeill et al. | 342/22 |
| 2009/0292468 A1 | 11/2009 | Wu et al. | |
| 2010/0052969 A1* | 3/2010 | Niktash | 342/22 |
| 2010/0103019 A1* | 4/2010 | Ammar | 342/22 |
| 2010/0109938 A1* | 5/2010 | Oswald et al. | 342/90 |
| 2010/0194628 A1* | 8/2010 | Christianson et al. | 342/26 B |
| 2011/0084868 A1* | 4/2011 | Daly et al. | 342/22 |
| 2011/0102234 A1* | 5/2011 | Adams et al. | 342/22 |
| 2013/0076556 A1* | 3/2013 | Boulais et al. | 342/22 |
| 2013/0107052 A1* | 5/2013 | Gloger et al. | 348/148 |

FOREIGN PATENT DOCUMENTS

| | | |
|---|---|---|
| KR | 10-0331785 | 4/2002 |
| KR | 10-2008-0056543 | 6/2008 |
| WO | WO-94-16340 | 7/1994 |

OTHER PUBLICATIONS

International Search Report and Written Opinion of the International Searching Authority dated Jun. 15, 2011, International App. No. PCT/US2010/054775.

* cited by examiner

*Primary Examiner* — Peter Bythrow (74) *Attorney, Agent, or Firm* — Advent, LLP (57) ABSTRACT

A standoff range, sense-through-obstruction radar system is capable of detecting micro-Doppler, or life form signatures, and movements through obstructions at stand-off ranges and displaying the target information over a live video feed of the area under surveillance. The sense-through-obstruction radar system comprises an antenna assembly that includes a horn antenna and a reflector configured to reflect radio frequency (RF) energy to/from the horn antenna. An antenna pointing assembly supports the antenna assembly. The antenna pointing assembly is configured to move the antenna assembly to point the antenna assembly toward an obstruction. A sensor assembly is mounted to the antenna assembly so that the sensor assembly is aligned with the RF beam formed from the RF energy reflected from the reflector to the horn antenna. The sensor assembly is configured to detect the location of the obstruction and to provide information to assist pointing of the antenna assembly toward the obstruction.

15 Claims, 8 Drawing Sheets

STANDOFF RANGE SENSE THROUGH OBSTRUCTION RADAR SYSTEM

CROSS-REFERENCE TO RELATED APPLICATIONS

The present application is a divisional under 35 U.S.C. §120 of U.S. patent application Ser. No. 12/916,008, titled "STANDOFF RANGE SENSE THROUGH OBSTRUCTION RADAR SYTEM," filed Oct. 29, 2020, which claims the benefit under 35 U.S.C. §119(e), of U.S. Provisional Application Ser. No. 61/257,469, filed Nov. 2, 2009. U.S. patent application Ser. No. 12/916,008 and U.S. Provisional Application Ser. No. 61/257,469 are herein incorporated by reference in its entirety.

BACKGROUND

Sense through obstruction radar systems allow users to gain actionable intelligence through obstructions such as building walls, walls, fences, and foliage. These radars may be used by the military, police, security, and firemen to provide a capability of detecting, locating, identifying, and classifying moving and stationary humans for rescue and clearing operations. Sense through obstruction radars include a transmitter that transmits electromagnetic waves that are reflected by objects and are then detected by the radar's receiver. The transmitted waves interact with objects that change the properties of the returned waves. When an object is moving at a constant velocity, the returned wave is shifted in frequency, which is called the Doppler Effect. The larger the velocity, the larger the frequency shift. When the object is moving towards the radar the frequency of the returned wave is increased. Conversely, when the object is moving away from the radar, the frequency of the returned wave is decreased. When the target is not moving but is vibrating the returned signal exhibits frequency sidebands called micro-Doppler. Because electromagnetic waves travel roughly at the speed of light, the round trip time from the radar to the target provides information on the range of the target. Depending on the material, some portion of the electromagnetic waves penetrates through obstructions such as walls, but the amplitude of the waves is attenuated. For a given material, the lower the frequency of the wave, the less attenuation electromagnetic wave exhibits. As the frequency of the electromagnetic waves decreases, the difficulty of measuring micro-Doppler from human or animal life forms increases. Radars usually operate in the frequency range of 300 MHz to 8 GHz to use the properties of electromagnetic waves that can penetrate through obstructions, while measuring Doppler and micro-Doppler effects of human or animal life-forms. However, detecting a human or animal life-form behind an obstruction is difficult because the transmitted and reflected waves are both attenuated by the obstruction. This makes detecting the Doppler and micro-Doppler due to the human or animal life-form difficult, especially in the presence of noise that is inherent in a radar. Another difficulty encountered when detecting slow moving and vibrating objects is that the frequency shifts and the signals are extremely small, making it difficult to detect these shifts in the presence of the stationary objects in the radars field of view, especially in the presence of noise.

SUMMARY

A standoff range, sense-through-obstruction radar system is disclosed that is capable of detecting micro-Doppler, or life form signatures, and movements through obstructions at stand-off ranges and a method of displaying the target information over a live video feed of the area under surveillance. In an implementation, the sense-through-obstruction radar system comprises an antenna assembly that includes a horn antenna and a reflector configured to reflect radio frequency (RF) energy to/from the horn antenna. An antenna pointing assembly supports the antenna assembly. The antenna pointing assembly is configured to move the antenna assembly to point the antenna assembly toward an obstruction. A sensor assembly is mounted to the antenna assembly so that the sensor assembly is aligned with the RF beam formed from the RF energy reflected from the reflector to the horn antenna. The sensor assembly (e.g., a range finder and an electro-optical camera) is configured to detect the location of the obstruction and to provide information to assist pointing of the antenna assembly toward the obstruction by the antenna pointing assembly. The radar system may include a radar computing device configured to direct movement of the antenna assembly by the antenna pointing assembly in response to the detection of the location of the obstruction by the sensor assembly.

During operation of the sense-through-obstruction radar system, range information is transmitted to the radar computing device, which is operable to utilize the range information to configure timing of transmit-receive cycles associated with the sense-through-obstruction radar system. Track data corresponding to a filtered range/range-rate pair is also received from the radar computing device. At least one track box may be superimposed over a real-time image that represents a field of view of the sense-through-obstruction radar system. The track box corresponds to the track data and represents a target detected by the sense-through-obstruction radar system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Stand-off range sense through obstruction radars furnish enhanced capability to detect moving and stationary micro-Doppler, or life-form, signatures for rescue and clearing operations. Typical obstructions include walls of buildings, foliage, and so forth, but could be any type of obstruction except for solid metal obstructions. Stand-off range sense through obstruction radars can be used by the military, police, security, and firemen. Additionally, the radars can provide standoff range human biometric monitoring for medical personnel to help save lives (e.g., battlefield wounded). It is also desirable that these radars be able to detect very low velocity motion and small motion (also known as micro-Doppler), as exhibited by life-forms, in the presence of all the stationary objects, or clutter, that are in the radars field of view (FOV) and range of interest. It is also desirable that these radars be capable of operating at stand-off ranges greater than or equal to at least twenty (20) meters either as a requirement of the application or to provide safety or stealth to the operators. Functionally, to be useful to the military, police, security, firemen, and medical personnel, it is desirable that these radars be easy to setup, operate, and present the target information in an easy to understand format to the operator.

Accordingly, a standoff range, sense-through-obstruction radar system is disclosed that is capable of detecting micro-Doppler, or life form signatures, and movements through obstructions at stand-off ranges and a method of displaying the target information over a live video feed of the area under surveillance. In an implementation, the sense-through-obstruction radar system comprises an antenna assembly that includes a horn antenna and a reflector configured to reflect radio frequency (RF) energy to/from the horn antenna. This horn and reflector pair constitutes a high gain antenna assembly that provides sufficient gain to enable the system to operate at stand-off ranges. The high gain antenna is mounted to an antenna pointing assembly that is configured to point the antenna assembly towards the obstruction of interest. A sensor assembly, which may be comprised of an electro-optical camera, a range finder, and so on, is mounted to the antenna assembly so that the sensor assembly is aligned with the RF beam formed from the RF energy from the horn antenna that is reflected from the reflector. The sensor assembly is configured to provide information to assist pointing of the antenna assembly toward the obstruction by the antenna pointing assembly.

A radar computing device such as a computer, laptop computer, tablet computer, and so on, is provided with a graphical user interface (GUI) that is configured to simplify the setup and operation of the sense through obstruction radar. The GUI provides this functionality through the user interface elements tied to the antenna pointing device, the outputs of the range finder and electro-optical camera, and displays radar data in an easy to understand format. During operation of the sense-through-obstruction radar system, range information is transmitted to the radar computing device, which can utilize the range information to control the timing of transmit-receive cycles associated with the sense-through-obstruction radar system to keep the radar range of interest centered on a target of interest. Additionally, track data corresponding to a filtered range/range-rate pair associated with a target is also received from the radar computing device. At least one track box may be superimposed over a real-time image that contains the FOV of the sense-through-obstruction radar system. This real-time image and the track box are displayed in the GUI. The track box corresponds to the track data and represents a target detected by the sense-through-obstruction radar system.

EXAMPLE IMPLEMENTATIONS

Figure 1:
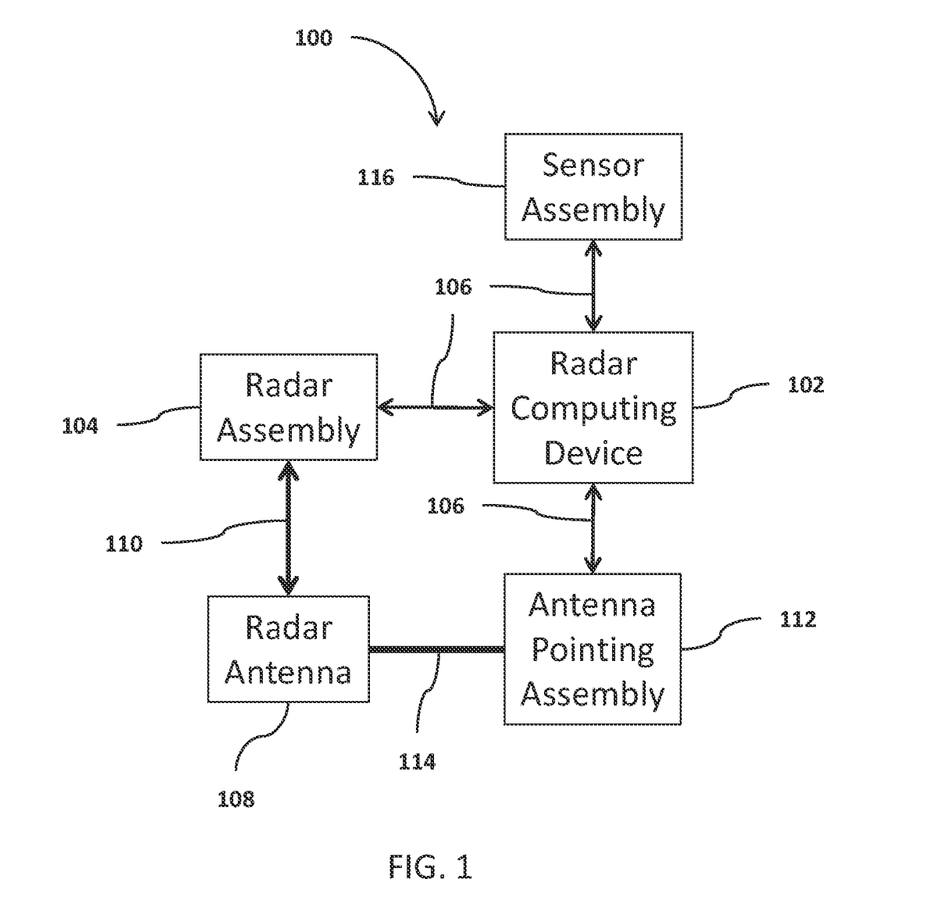
FIG. 1 is a block diagram illustrating an example implementation of a standoff range sense through obstruction radar that is capable of detecting micro-Doppler, or life form signatures, and movements through obstructions at stand-off ranges and a method of displaying the target information over a live video feed of the area under surveillance.

FIG. 1 illustrates an example implementation of a sense through obstruction radar system 100. The system 100 is comprised of a radar computing device 102 that is connected to a radar assembly 104 through one or more communications cables 106. The radar computing device 102 can be a computer, a laptop computer, a tablet computer and so on that is comprised of at least a processor, memory, a display device, and an input device. The processor provides processing functionality and may execute one or more software programs which implement techniques described herein and may access the memory to store and retrieve data.

The memory is tangible computer-readable media that provides storage functionality to store and retrieve various data associated with the operation of the radar computing device, such as the software program, code segments and other types of digital data. The memory may include, for example, removable and non-removable memory elements such as RAM, ROM, Flash (e.g., SD Card, mini-SD card, micro-SD Card), magnetic, optical, USB memory devices, and so forth.

The display device provides visual display functionality for the radar computing device and may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments.

The input device allows the operator to operate the radar computing device and may be comprised of a keyboard, and/or a pointing device such as a mouse, trackball or touch screen such as a capacitive touch screen, a resistive touch screen, an infrared touch screen, combinations thereof, and the like.

The radar assembly 104 includes, but is not necessarily limited to: a transmitter such as a microwave power amplifier, a modulator such as a microwave switch or phase shifter, a receiver such as low-noise microwave amplifier, frequency down converter and an analog to digital converter, and a frequency source(s) such as a voltage controlled oscillator(s) or a frequency synthesizer(s). An example radar assembly 104 is described in U.S. Pat. No. 7,817,082, issued Oct. 19, 2010, which is herein incorporated by reference in its entirety. The communications cable(s) 106 may be any standard communication cable used to connect computing devices to peripherals such as serial, parallel, USB, Ethernet, IEEE 1394, PCI Express, and so on.

The radar assembly 104 is connected to a radar antenna 108 through one or more radio frequency (RF) cables 110. The radar antenna 108 can be any type of high gain antenna such as horn antenna(s), parabolic dish antenna(s), flat panel antenna(s), and so on. The RF cable(s) 110 can be any type of low loss microwave coaxial cable such as RG-58A, RG-223, SR-085, SR-141, and so on.

The radar computing device 102 is also connected to an antenna pointing assembly 112 through the communications cable(s) 106. The antenna pointing assembly 112 can be any type of gimbal, either electric or hydraulic, that allows the antenna to be pointed at the obstruction of interest. The radar antenna 108 is mounted to the antenna pointing assembly 112 by mounting hardware 114 such as brackets, nuts and bolts, and so on. The radar computing device 102 is also connected to a sensor assembly 116 through communications cable(s) 106. The sensor assembly 116 is comprised of at least a range finder, either optical or RF, and an electro-optical camera such as a visible light camera, a low-light capable visible light camera, an IR camera, and so on.

Figure 2:
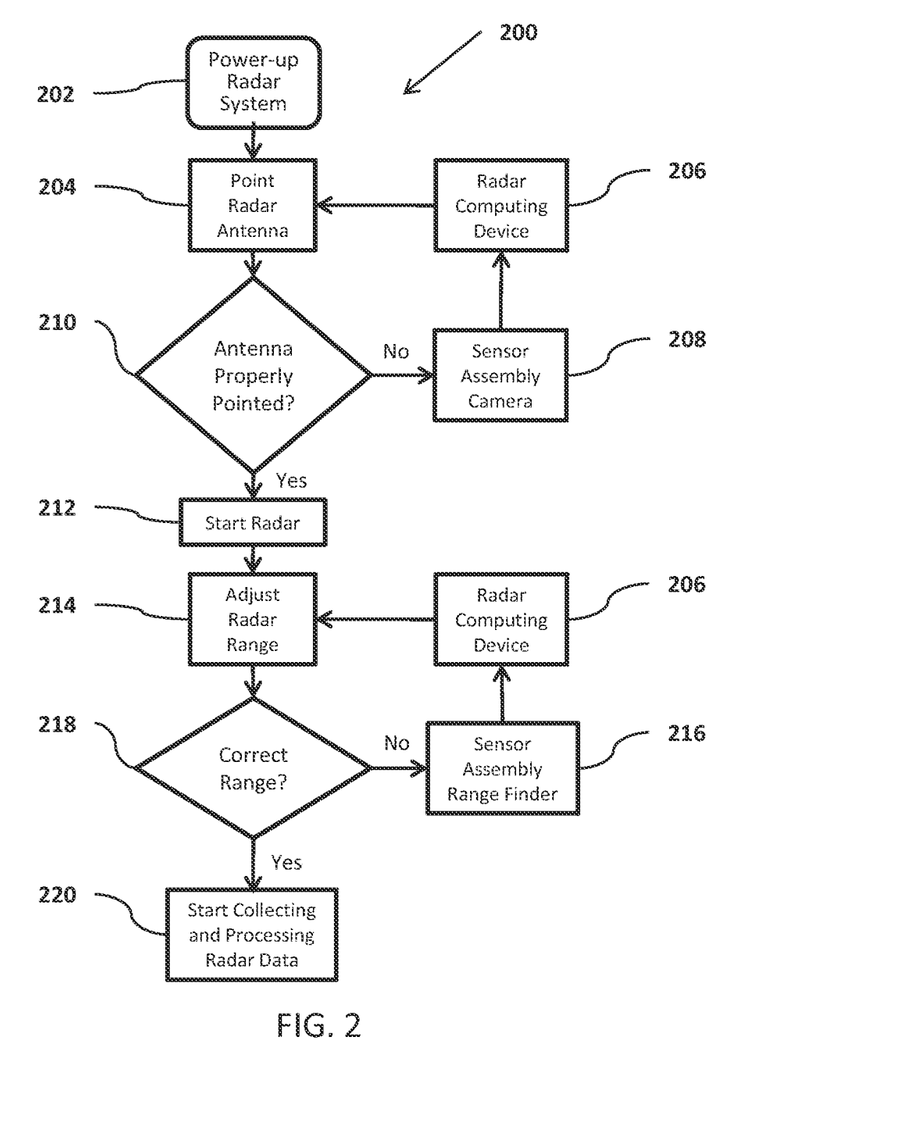
FIG. 2 is a flow chart illustrating an example setup procedure for a sense through obstruction radar system shown in FIG. 1.

FIG. 2 illustrates an example setup procedure 200 for a sense through obstruction radar system such as the sense through obstruction radar system 100 shown in FIG. 1. As shown, the process is initiated by powering up the radar system 202. The operator then points the radar antenna 204 using the radar computing device 206. Images from the sensor assembly camera 208 are used to determine that the radar antenna is properly pointed 210. Once the radar antenna is properly pointed 210, the radar is started 212. The radar range of interest 214 may then be adjusted using the radar computing device 206 and feedback from the sensor assembly range finder 216 to adjust the range of the radar. The range of the radar is set by adjusting the time between the transmitted RF energy and the start of the receiver RF energy measurement. This time is calculated using the range provided by the sensor assembly range finder 216 multiplying it by two (round trip distance) and dividing by the speed of light. When the radar range is correct 218, the radar may collect and process radar data 220.

Figure 3:
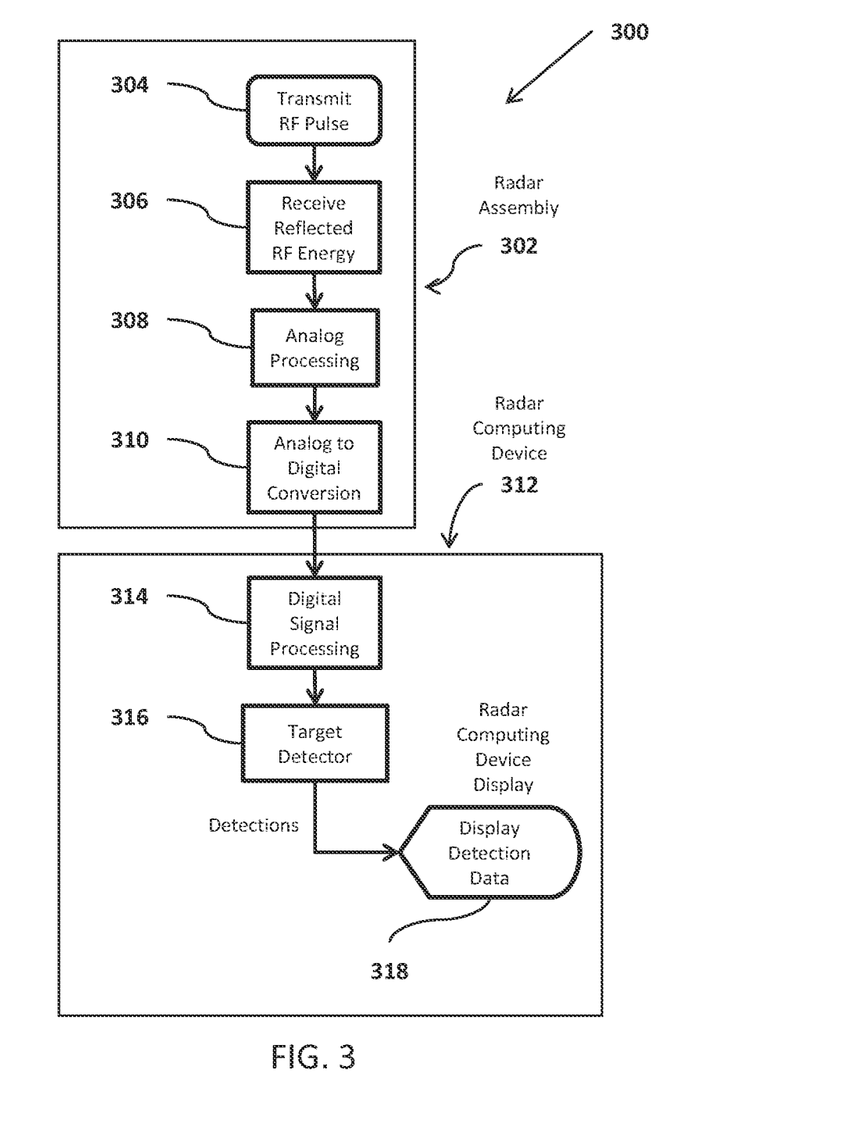
FIG. 3 is a flow chart illustrating an example radar data processing cycle for a sense through obstruction radar system shown in FIG. 1.

FIG. 3 illustrates an example radar data processing cycle 300. The cycle (process) 300 is initiated when the radar assembly 302 transmits a radio frequency (RF) pulse 304. The radar assembly 302 then receives the reflected RF energy 306 and performs analog processing 308 such as filtering, frequency down conversion, gating, and so on, on the received signal. The processed analog signal is then converted to a digital signal using an analog to digital (A/D) converter 310 which is connected to the radar computing device 312. The radar computing device 312 then processes the digital signal using digital signal processing (DSP) techniques 314 such as filtering, frequency down conversion, spectral analysis, and so on. The processed digital signal is then sent to a target detector 316 to determine how many targets are detected, their range, and range rates. The range and range rate detection information is sent to the radar computing device's display 318 for display to the operator.

Figure 4:
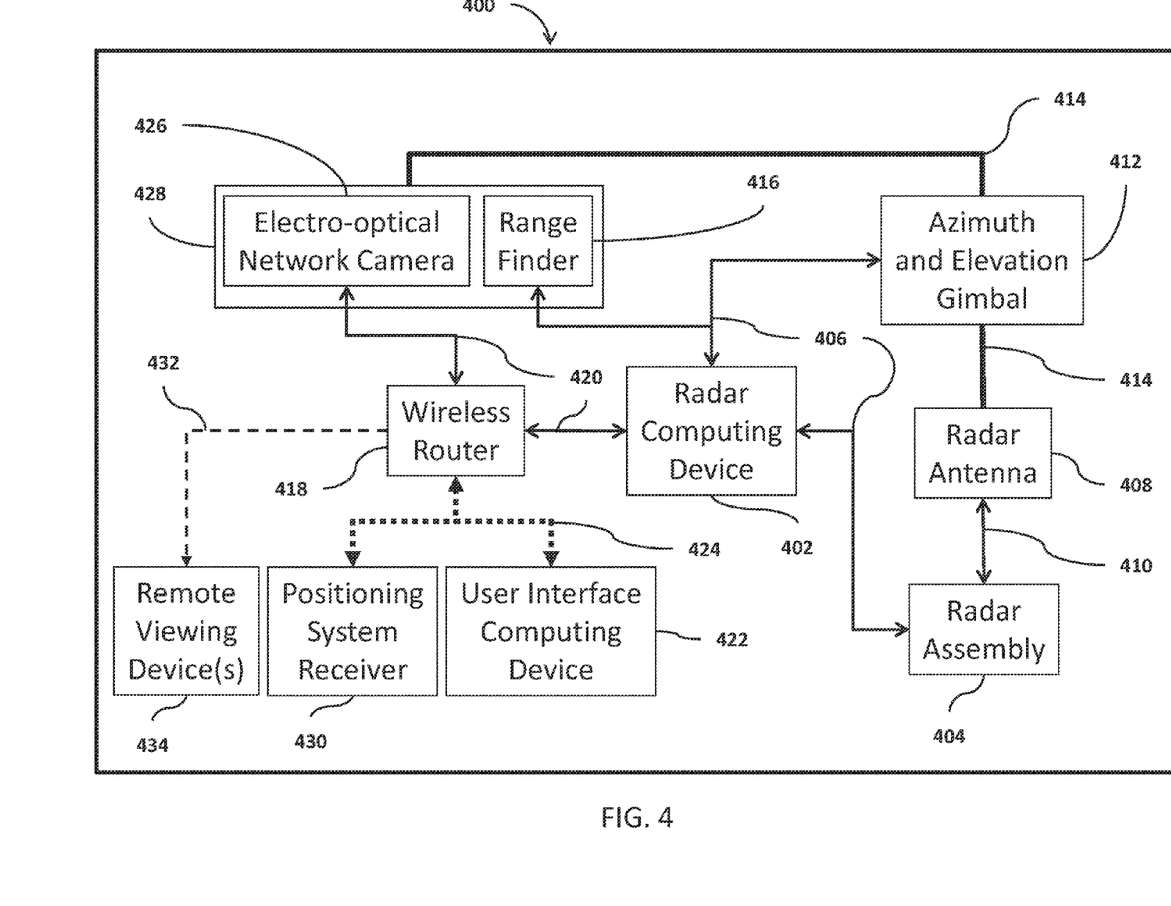
FIG. 4 is a block diagram illustrating an example implementation of the sense through obstruction radar shown in FIG. 1.

FIG. 4 illustrates an example implementation of the sense through obstruction radar system shown in FIG. 1. The sense through obstruction radar system 400 shown is comprised of a radar computing device 402 that is connected to a radar assembly 404 through one or more communications cables 406. The radar computing device 402 sets RF parameters for the radar assembly 404 to provide a RF signal to a radar antenna 408 via one or more RF cables 410. The radar computing device 402 is also connected to an azimuth and elevation gimbal 412 through communications cable(s) 406. The azimuth and elevation gimbal 412 receives antenna pointing commands from the radar computing device 402 via the communication cable(s) 406. The radar antenna 408 is mounted to the azimuth and elevation gimbal 412 using mounting hardware 414. The radar computing device 402 is also connected to a range finder 416 through communications cable(s) 406. The radar computing device 402 is also connected to a wireless router 418 using one or more network cables 420. A user interface computing device 422 that hosts the user interface used by the operator is connected to the wireless router 418 through a network link 424. The network link 424 can be a network cable(s), a wireless link such as an 802.11 Wi-Fi, Bluetooth, ZigBee, and so on. An electro-optical network camera 426 is connected to the wireless router 418 so that it can provide streaming video to the user interface computing device 422 or the radar computing device 402. A sensor assembly 428 is mounted on the azimuth and elevation gimbal 412 using mounting hardware 414. In the implementation illustrated, the sensor assembly 428 is comprised of a range finder 416 and an electro-optical network camera 426. In other implementations, it is contemplated that the sensor assembly 428 may include various other types of sensors/sensing equipment. The sensor assembly 428 is aligned with the radar antennas 408 RF beam so that the operator can position the center of the RF beam based on the center of the image provided by the electro-optical network camera 426 using the azimuth and elevation gimbal 412 and the radar computing device 402. A positioning system receiver 430 is connected to the wireless router 418 through the network link 424. The positioning system receiver 430 can be a Global Positioning System (GPS) receiver, a GLONASS receiver, a COMPASS receiver, a GALILEO receiver, a cell tower triangulation receiver, and so on. The positioning system receiver 430 provides latitude, longitude, and altitude information to the user interface computing device 422. The wireless router 418 provides wireless links 432 to remote viewing device(s) 434 so that the information presented on the display of the user interface computing device 422 can be displayed on the remote viewing device(s) 434. The remote viewing device(s) 434 can be a computer(s), a laptop computer(s), a tablet computer(s), a hand-held computer(s) such as an IPOD brand handheld computer, a smart phone(s) such as an IPHONE brand smart phone, a BLACKBERRY brand smart phone, or an ANDROID based smart phone, and so on, or any combination thereof. Power is provided to the electrical components from a suitable power source such as a battery (e.g., a 24V battery (not shown)), or the like). The system includes the software hosted on the radar computing device 402 for controlling the azimuth and elevation gimbal 412, the radar control and signal processing software hosted on the radar computing device 402, and the user interface and data display software hosted on the user interface computing device 422.

Figure 5:
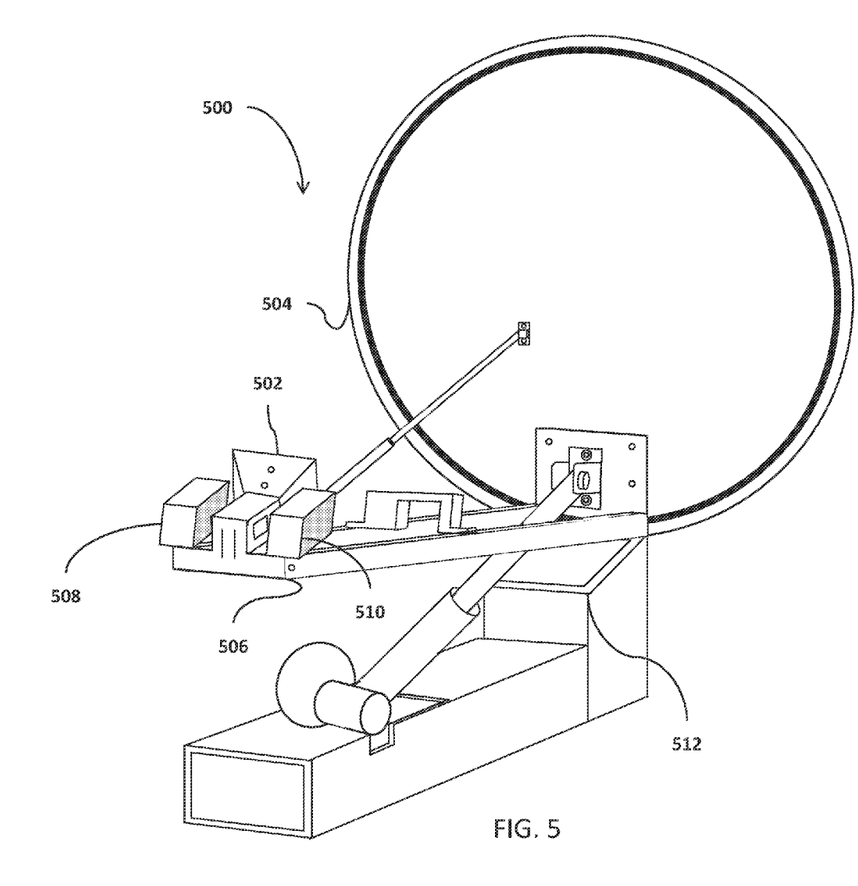
FIG. 5 is a perspective view depicting an example implementation of the sense through obstruction radar system shown in FIGS. 1 and 2, further illustrating the radar antenna, sensor assembly and azimuth and elevation gimbal used for pointing the antenna.
Figure 6:
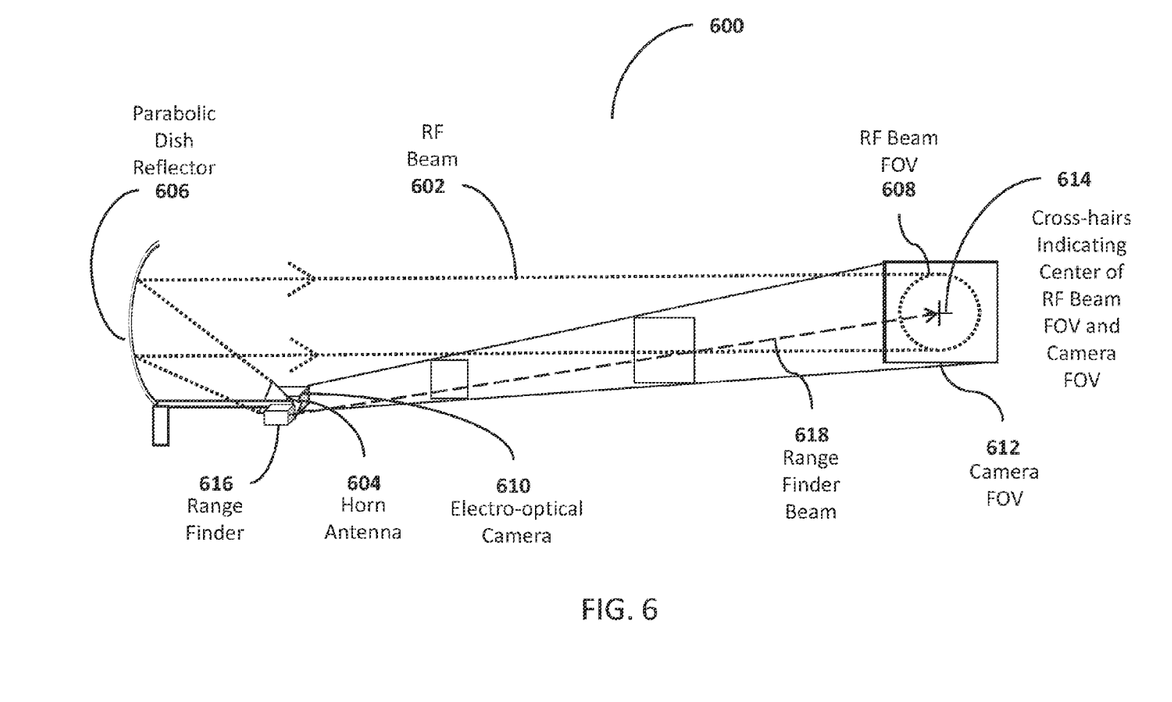
FIG. 6 is a diagrammatic pictorial representation illustrating the alignment of the sensor assembly and the radars RF beam for the sense through obstruction radar system shown in FIG. 1, wherein the sensor assembly is comprised of a range finder and an electro-optical camera, and the alignment of the range finder beam, the electro-optical cameras field of view (FOV), and the radars RF beam is shown.

FIG. 5 depicts an example radar antenna assembly 500 of the sense through obstruction radar system 100 shown in FIG. 1. The radar antenna assembly 500 includes a horn antenna 502 that is mounted to a parabolic dish reflector 504 in an offset feed configuration using support arms 506. Horn antenna 502 and parabolic dish reflector 504 constitute a high-gain radio frequency (RF) antenna. Range finder 508 and electro-optical camera 510 are mounted on support arms 506 on either side of the horn antenna 502 so that they are aligned with the RF beam that is formed from the RF energy that is reflected from the parabolic dish reflector 504. This alignment of the center of the RF beam, electro-optical cameras FOV, and the range finder beam is illustrated in FIG. 6. This subassembly is mounted to an electro-mechanical azimuth and elevation antenna pointing device 512.

FIG. 6 depicts an example radar antenna assembly 600 of the sense through obstruction radar system 100 shown in FIG. 1. The RF beam 602 is formed from the RF energy that is transmitted from the horn antenna 604 and reflected off of the parabolic dish reflector 606 and has a field of view (FOV) 608. An electro-optical camera 610 is mounted next to the horn antenna 604 such that the camera FOV 612 has its center aligned with the center of the RF beam FOV 608. This center point is indicated by cross-hairs 614. A range finder 616 is mounted next to the horn antenna 604 such that the center of the range finder beam 618 is incident upon the center of the RF beam FOV 608 and the center of the cameras FOV 612.

Figure 7:
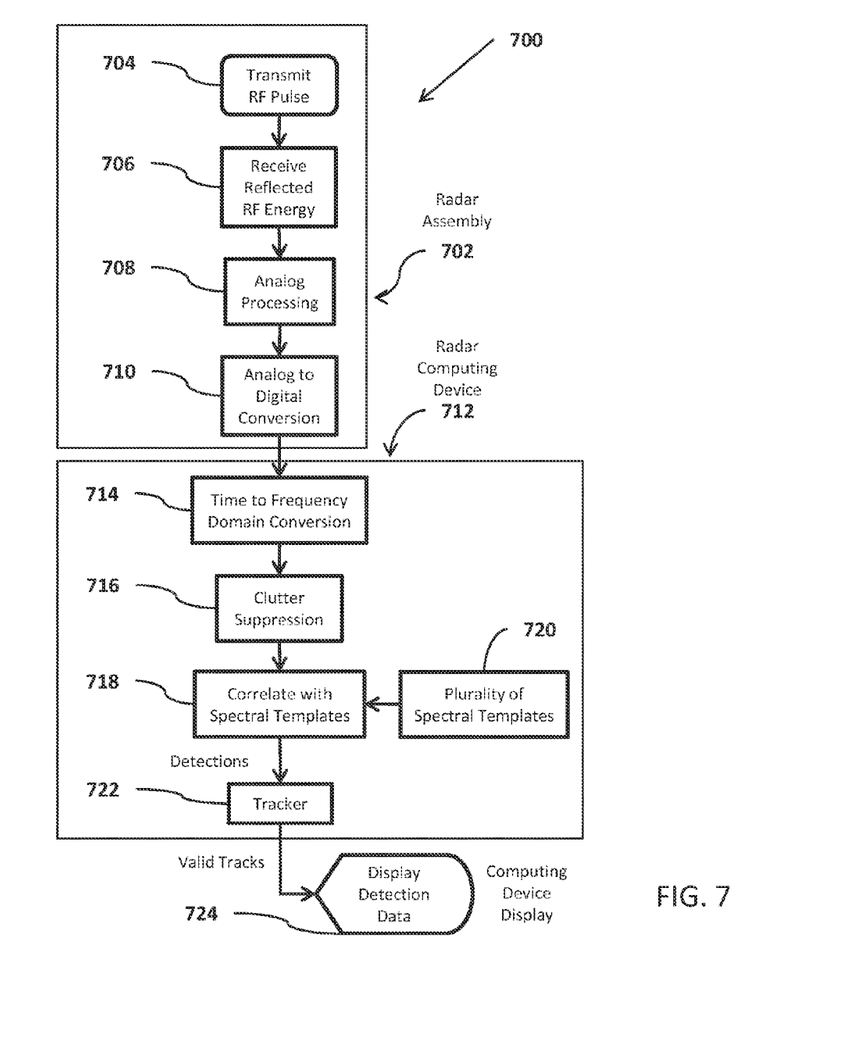
FIG. 7 is a flow chart illustrating an example radar data processing cycle for the sense through obstruction radar system shown in FIG. 1.

FIG. 7 illustrates a radar data processing cycle 700 for the sense through obstruction radar shown in FIG. 1. The cycle (process) 700 starts when the radar assembly 702 transmits a radio frequency (RF) pulse 704. The radar assembly 702 then receives the reflected RF energy 706 and performs analog processing 708 on the received signal. The processed analog signal is then converted to a digital signal using an analog to digital (A/D) converter 710 that is connected to a radar computing device 712. The radar computing device 712 then converts the digital signal from the time domain to the frequency domain using digital signal processing (DSP) techniques 714 such as a discrete Fourier transform, wavelet transform, and so on. Additional DSP techniques such as filtering, are used to suppress the clutter in the signal 716. The processed digital signal is then sent to a detector 718 that correlates the signal with a plurality of spectral templates 720 to determine how many targets are detected, their range, and range rates. The range and range rate detection information is sent to a tracker 722. The tracker 722 creates, destroys, and updates tracks (filtered range/range-rate pairs) based on whether the received range/range-rate data is associated with an existing track or represents a new track. When an existing track does not receive an update from the tracker within a set period of time the track is eliminated. In one or more implementations, the tracker 722 may employ nearest neighbor logic to associate new data with existing tracks and a Kalman Filter, to update and propagate the tracks. However, it is contemplated that other techniques may be employed to achieve similar results. Valid track data is furnished to a computing device display 724, which could be the display connected to the radar computing device 712, or the display connected to another computing device that is connected to the radar computing device 712 using a network as shown in FIG. 4. The radar computing device 712, which includes or is connected to the display 724, uses the range-rate information to determine when the micro-Doppler signature represents a moving or stationary object, and color codes the displayed track information accordingly.

Figure 8:
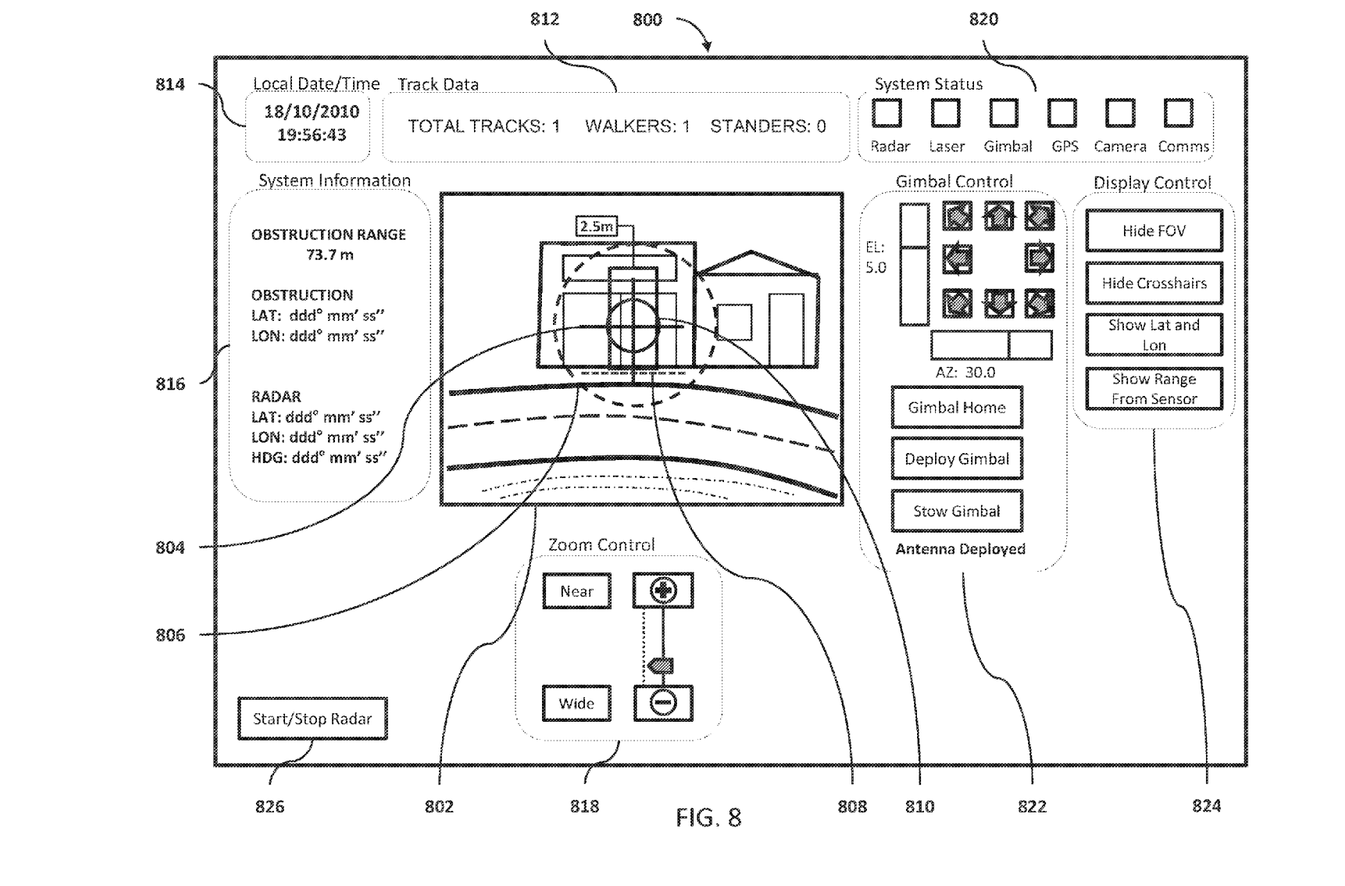
FIG. 8 is a diagrammatic pictorial representation illustrating a graphical user interface (GUI) suitable to operate the sense through obstruction radar system shown in FIG. 1.

FIG. 8 illustrates an example Graphical User Interface (GUI) 800 configured to operate a sense through obstruction radar system such as the sense through obstruction radar system 100 shown in FIG. 1 and described above. The GUI 800 may be implemented as a set of instructions (software) that can be hosted on a user interface computing device 422 or on another computing device that is connected to the user interface computing device 422 via a network as shown in FIG. 4. The GUI 800 furnishes video display functionality to the operator or other users of the radar system. In implementations, the video data received from the electro-optical camera 428 shown in FIG. 4 may be displayed in real-time 802. Several additional visual elements can be displayed over the real-time video. For example, the following list is representative of visual elements that can provide additional information to the user but does not include all possible useful visual elements. The first visual overlay includes crosshairs 804 that represent the center of the cameras field of view (FOV) 612 and the center of the RF beams FOV 608 by virtue of the alignment of the camera FOV 612 and the RF beams FOV 608 as shown in FIG. 6. The crosshairs 804 help the operator point the azimuth and elevation gimbal 412, shown in FIG. 4, so that the RF beams FOV 608, shown in FIG. 6, is pointed at the obstruction of interest. The second visual overlay includes a circle 806 that represents the RF beams FOV 608, shown in FIG. 6. The circle 806 helps the operator determine where it is possible for the radar to detect human micro-Doppler signatures. The third visual overlay includes the ground/floor indicator 808 that helps the operator position the elevation angle of the azimuth and elevation gimbal 412, shown in FIG. 4, so that the center of the RF beams FOV 608, shown in FIG. 6, is at an optimal height for detecting human micro-Doppler signatures. Another visual overlay may include the track indicator(s) 810 that represents a valid track or detection of a micro-Doppler signature. Each valid track may have an associated track indicator 810 overlaid on the real-time video display 802. The track indicator(s) 810 can also display the range of the detection behind the obstruction, in this case the front wall of a building. This value can change when updated valid track information is received from the radar computing device 712 shown in FIG. 7. The track indicator(s) 810 can also be configured to show the range from the sense through obstruction radar system 100, shown in FIG. 1, instead of the range behind the obstruction. The track indicator(s) 810 can be color coded to indicate when the detection represents a moving or stationary micro-Doppler signature. The number and types of tracks are shown in the Track Data area 812 of the GUI 800. The local date and time are shown in the Local Date/Time area 814 of the GUI 800. The sense through obstruction radar latitude, longitude, and heading information provided by the positioning system receiver 430, shown in FIG. 4, are displayed in the System Information area 816 of the GUI 800. Also shown in the System Information area 816 is the range of the obstruction from the sense through obstruction radar provided by the range finder 416 shown in FIG. 4, and the geographic coordinates (e.g., latitude and longitude) of the obstruction computed by the radar computing device 712 using the latitude, longitude, and/or heading of the radar along with the range to the obstruction. The Zoom Control area 818 of the GUI 800 may be used to control the zoom level of the electro-optical camera 428 shown in FIG. 4. The System Status area 820 of the GUI 800 may be used to monitor the health of all the communications interfaces. The Gimbal Control area 822 of the GUI 800 may be used to monitor and control the azimuth and elevation gimbal 412, shown in FIG. 4. The Display Control area 824 of the GUI 800 may be used to control the display of different visual elements or data on the display. The Radar Start/Stop button 826 may be used to turn the radar assembly 404 shown in FIG. 4 on or off.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A method for operating a sense-through-obstruction radar system, comprising:
  receiving range information from a range finder associated with the sense-through-obstruction radar system, the range information describing a range to an obstruction;
  transmitting the range information to a radar computing device, the radar computing device operable to utilize the range information to configure a timing of a transmit-receive cycle associated with the sense-through-obstruction radar system;

receiving track data corresponding to a filtered range/range-rate pair from the radar computing device; and causing at least one track box to be superimposed over a real-time image that represents a field of view of the sense-through-obstruction radar system, the at least one track box corresponding to the track data and representing a target detected by the sense-through-obstruction radar system, wherein the obstruction is between the target and the sense-through-obstruction radar system.

2. The method as recited in claim 1, wherein the causing at least one track box to be superimposed over a real-time image comprises causing at least one track box to have a first hue when the target is stationary and a second hue when the target is in motion.

3. The method as recited in claim 1, wherein the causing at least one track box to be superimposed over a real-time image comprises causing at least one track box to be represented as a human avatar.

4. The method as recited in claim 3, wherein the causing at least one track box to be superimposed over a real-time image further comprises causing at least one track box to be represented as a three-dimensional human avatar.

5. The method as recited in claim 2, wherein the first hue comprises red and the second hue comprises green.

6. A sense-through-obstruction radar system comprising:
a range finder configured to detect a range to an obstruction and to generate range information describing the range to the obstruction;
a radar operable to furnish sense-through-obstruction target detection, the radar including a radar computing device that is operable to utilize the range information to configure a timing of a transmit-receive cycle associated with the sense-through-obstruction radar system; and
a computing device communicatively coupled to the radar, the computing device including:
a display device;
a memory operable to store one or more modules; and
a processing system operable to execute the one or more modules to:
transmit the range information to the radar computing device;
receive track data corresponding to a filtered range/range-rate pair from the radar computing device; and
cause at least one track box to be superimposed over a real-time image displayed by the display device, the real-time image representing a field of view of the radar, the at least one track box corresponding to the track data and representing a target detected by the radar, wherein the obstruction is between the target and the radar.

7. The sense-through-obstruction radar system as recited in claim 6, further comprising a display module stored in memory, the processing system operable to execute the display module to cause the at least one track box to have a first hue when the target is stationary and to have a second hue when the target is in motion.

8. The sense-through-obstruction radar system as recited in claim 7, wherein the processing system is operable to execute the display module to cause the at least one track box to be represented as a human avatar.

9. The sense-through-obstruction radar system as recited in claim 8, wherein the processing system is operable to execute the display module to cause the at least one track box to be represented as a three-dimensional human avatar.

10. The sense-through-obstruction radar system as recited in claim 6, wherein the first hue comprises red and the second hue comprises green.

11. A sense-through-obstruction radar system comprising:
a range finder configured to detect a range to an obstruction and to generate range information describing the range to the obstruction;
a radar operable to furnish sense-through-obstruction target detection, the radar including a radar computing device operable to utilize the range information to configure a timing of a transmit-receive cycle associated with the radar; and
a computing device communicatively coupled to the radar, the computing device operable to transmit the range information to the radar computing device and to receive track data corresponding to a filtered range/range-rate pair from the radar computing device; wherein the computing device is configured to cause at least one track box to be superimposed over a real-time image displayed by a display device associated with the computing device, the real-time image representing a field of view of the radar, the at least one track box corresponding to the track data and representing a target detected by the radar, wherein the obstruction is between the target and the radar.

12. The sense-through-obstruction radar system as recited in claim 11, wherein the computing device is operable to cause the at least one track box to have a first hue when the target is stationary and to have a second hue when the target is in motion.

13. The sense-through-obstruction radar system as recited in claim 12, wherein the computing device is configured to cause the at least one track box to be represented as a human avatar.

14. The sense-through-obstruction radar system as recited in claim 13, wherein the computing device is further configured to cause the at least one track box to be represented as a three-dimensional human avatar.

15. The sense-through-obstruction radar system as recited in claim 12, wherein the first hue comprises red and the second hue comprises green.

\* \* \* \* \*